United States Patent
Klassen et al.

(10) Patent No.: US 6,996,064 B2
(45) Date of Patent: Feb. 7, 2006

(54) SYSTEM AND METHOD FOR DETERMINING NETWORK THROUGHPUT SPEED AND STREAMING UTILIZATION

(75) Inventors: Fredrick K. P. Klassen, Coquitilam (CA); Robert M. Silverman, Westfield, NJ (US)

(73) Assignee: International Business Machines Corporation, Armonk, NY (US)

( * ) Notice: Subject to any disclaimer, the term of this patent is extended or adjusted under 35 U.S.C. 154(b) by 751 days.

(21) Appl. No.: 09/746,183

(22) Filed: Dec. 21, 2000

(65) Prior Publication Data

US 2002/0080726 A1 Jun. 27, 2002

(51) Int. Cl.
*H04L 1/00* (2006.01)
(52) U.S. Cl. ...................... 370/238; 370/252
(58) Field of Classification Search ............... 370/252, 370/395.21, 517, 238; 375/225, 324
See application file for complete search history.

(56) References Cited

U.S. PATENT DOCUMENTS

| | | | | |
|---|---|---|---|---|
| 5,119,322 A * | 6/1992 | Stroobach | ................... | 708/312 |
| 5,315,580 A | 5/1994 | Phall | ..................... | 370/13 |
| 5,333,191 A * | 7/1994 | McCarthy | ................ | 379/386 |
| 5,381,404 A | 1/1995 | Sugano et al. | ............ | 370/13 |
| 5,434,860 A * | 7/1995 | Riddle | ..................... | 370/232 |
| 5,444,709 A * | 8/1995 | Riddle | ..................... | 370/474 |
| 5,450,394 A | 9/1995 | Gruber et al. | ............. | 370/17 |
| 5,477,531 A | 12/1995 | McKee et al. | ............. | 370/17 |
| 5,563,875 A | 10/1996 | Hefel et al. | ................ | 370/15 |
| 5,570,346 A | 10/1996 | Shur | ......................... | 370/17 |
| 5,596,719 A | 1/1997 | Ramakrishnan et al. | ................ | 395/200.02 |
| 5,627,766 A | 5/1997 | Beaven | ................. | 364/551.01 |
| 5,633,861 A | 5/1997 | Hanson et al. | ............. | 370/232 |
| 5,668,800 A | 9/1997 | Stevenson | ................. | 370/248 |
| 5,734,825 A | 3/1998 | Lauck | ................... | 395/200.13 |
| 5,768,520 A | 6/1998 | Dan et al. | ............... | 395/200.53 |
| 5,781,534 A | 7/1998 | Perlman et al. | ............ | 370/248 |
| 5,793,976 A | 8/1998 | Chen et al. | ............. | 395/200.54 |
| 5,838,919 A * | 11/1998 | Schwaller et al. | .......... | 709/224 |
| 6,393,124 B1 * | 5/2002 | Tsai et al. | ................. | 379/386 |
| 6,473,404 B1 * | 10/2002 | Kaplan et al. | ............. | 370/238 |
| 6,885,641 B1 * | 4/2005 | Chan et al. | ................ | 370/252 |

* cited by examiner

*Primary Examiner*—Chau Nguyen
*Assistant Examiner*—Joshua Kading
(74) *Attorney, Agent, or Firm*—Shelley M Beckstrand; Randall J. Bluestone (57) ABSTRACT

To evaluate a communications network, a plurality of network evaluation signals, or probative test packets, are selectively sent and received through the network. Responsive to these evaluation signals, network evaluation parameters are determined and stored. Queuing theory analysis, responsive to these parameters, determines the response time and throughput characteristics, including streaming utilization of the network.

24 Claims, 5 Drawing Sheets

SYSTEM AND METHOD FOR DETERMINING NETWORK THROUGHPUT SPEED AND STREAMING UTILIZATION

CROSS REFERENCES TO RELATED APPLICATIONS

U.S. patent application Ser. No. 09/76,179 entitled "SYSTEM AND METHOD FOR DETERMINING NETWORK DISCRETE UTILIZATION" filed concurrently herewith is assigned to the same assignee hereof and contains subject matter related to the subject matter of the present application. The above identified patent application is incorporated herein by reference.

BACKGROUND OF THE INVENTION

This application is an improvement upon copending U.S. patent application Ser. No. 09/267,843, filed Mar. 12, 1999, by F. K. P. Klassen and R. M. Silverman, entitled "SYSTEM AND METHOD FOR ANALYZING AND TUNING A COMMUNICATIONS NETWORK", and Ser. No. 09/452,403 filed Dec. 1, 1999 by K. Chan, F. K. P. Klassen, and R. M. Silverman for "System and Method for Monitoring Performance, Analyzing Capacity and Utilization, and Planning Capacity for Networks and Intelligent, Network Connected Processes".

1. Technical Field of the Invention

This invention relates to testing and analyzing a communications network. More particularly, the invention relates to determining throughput speed and streaming utilization.

2. Background Art

Users and managers of communications networks are interested in the capacity, performance, reliability, availability, topology, service level attainment, and modeling of their networks. Currently, many separate, incompatible, complicated, and often unsatisfactory tools are required to perform the tasks required by network managers.

One prior art technique provides for communication system analysis in which sequences of pings of different sizes are sent, transmitted in isolation from each other, in order to determine characteristics of the network beyond availability of resources and "usual" response time. In accordance with this technique, the best and mean times for the sequences of pings of different lengths are measured, and then the following are geometrically derived via use of the reciprocal of the packet size and bandwidth slope:

the network path's bandwidth,
the network path's propagation delay, and
the network path's queuing time.

Further network testing involves sending bursts of pings to determine the loss rate of packets, from which the "internal packet size of the network" can then be determined. By this it is meant that the minimum device buffer size in the transmission path of the network can be discovered. The sending of bursts of pings of decreasing size is also described, the intent of which is to determine if smaller packets are prioritized over larger packets. In this way, the following is determined:

the network path's minimum buffer size (also referred to as "internal packet size"); and
the network's short frame prioritization capability.

It is recognized in the art that there will generally be a plurality of network hops between the test station and the remote station, each with its own bandwidth. In these circumstances, taking the reciprocal of the slope of the line as the bandwidth is equivalent to saying that:

$$(1/\text{Bandwidth}) = (1/b1 + 1/b2 + \ldots 1/bn)$$

where $b1, b2, \ldots bn$ are the bandwidths of all the hops in the path. This will produce a bandwidth close to accurate only if there is one hop in the path that is significantly slower than all the others. Where this is not the case, the estimate may be inaccurate because no account is taken of the fact that for a multi-hop path, the intermediate nodes will delay onward transmission of a packet until the whole packet has been received.

U.S. patent applications Ser. No. 09/267,843 filed Aug. 12, 1999 by F. K. P. Klassen and R. M. Silverman for System and Method for Analyzing and Tuning a Communications Network (Klassen and Silverman), and Ser. No. 09/452,403 filed 1, Dec. 1999 by K. Chan, F. K. P. Klassen, and R. M. Silverman for System and Method for Monitoring Performance, Analyzing Capacity and Utilization, and Planning Capacity for Networks and Intelligent, Network Connected Processes (Chan, Klassen and Silverman) improved upon the then existing art by:

distinguishing between and calculating the values for the streaming and discrete speeds of the network; and
calculating the utilization of that connection.

The distinction between the discrete and streaming speeds of a network allows for two accurate measures of network speed across multiple hops, as opposed to the previously known one, potentially inaccurate measure.

The discrete speed reflects the network's maximum bandwidth for handling "conversational" type transaction traffic, such as query-response. The streaming speed reflects the network's maximum speed for "batch" type traffic, such as file transfers and print. The network's streaming speed can also be referred to as "network throughput bandwidth."

Thus, probative test packets are transmitted, received and time stamped, and then mathematically analyzed. The result is a system and method in which full network capacity analysis can be performed across networks of any size, including the Internet, and to do so with no need for network documentation or knowledge of network topology or knowledge of capacity of network components.

Prior art methods for determining the streaming speed (the maximum end-to-end speed for file and other batch transfers) include the following.

First, transmission of a large stream of echo (or one way) traffic. The bits transmitted are divided by total transmission time to determine the network's bidirectional (or one way) streaming speed.

Second, transmission of a burst of echo (or one way) traffic. The number of bits transmitted is divided by total transmission time to determine the network's bidirectional (or one way) streaming speed.

Third, transmission of a burst of long packets and a burst of an equal number of short packets. Then, (total long bits in burst minus total short bits in burst) is divided by (long burst transmission time minus short burst transmission time).

By "transmission of a burst of packets," is meant that a plurality of packets, for example ten packets, is transmitted in as rapid succession as possible. For calculations of network speed, a number of such burst tests or large stream tests are performed. The calculations for (maximum) network speed are then based upon the minimum transmission time experienced, and the calculation for average network speed, useful for utilization measures, is based upon the average transmission time experienced.

Each of these methods for determining streaming speed suffers from certain deficiencies. Unless performed at a time when there is absolutely no traffic anywhere on the connection, transmission of a stream of data interferes with existing user traffic and is interfered with by existing user traffic. In all other cases, such testing is disruptive to the network and the results are rendered inaccurate. On occasion, such testing can be useful in a small, private network. In most large networks, and across the Internet, such testing is both inaccurate and undesirable.

Unlike these streaming techniques, prior art methods for determining network speed derived from burst or discrete speed are not disruptive to the network. However, like the above streaming techniques, they are highly subject to inaccuracy, albeit for a different reason. While large streams of traffic will fill the network, bursts of traffic often will not fill the network, especially over connections that are long or fast. So current testing techniques relying on measuring total transmission and receipt time for a burst, or relying on comparison of transmission and receipt times for bursts of different size packets, will measure both productive and dead time on the network, and will, therefore, arrive at false calculations of network streaming speed. Heretofore, all probative test measure methods for determination of end to end network speed for multihop connections suffered from inaccuracy and, in the case of streaming, disruptiveness as well, especially in large network environments and in Internet connections.

An alternative method for determining streaming speed lies somewhere between bursting and streaming, and is referred to as a complex burst test. In the complex burst test method, a burst of long messages and a burst of short messages are transmitted, and the difference in bits sent is divided by the difference in transmission time in order to determine the streaming speed of the network. This method is accurate only if the bursts fill the network, and is otherwise prone to error. This problem is exacerbated by longer network lengths and faster networks.

It is an object of the invention to provide an improved system and method for network measurement and planning.

It is a further object of the invention to provide an improved method for calculating the streaming speed of a network.

It is a further object of the invention to provide the new concept that in a multihop network, there are two different measures of utilization, namely, streaming utilization and discrete utilization.

It is a further object of the invention to provide an improved method for determining end to end network streaming utilization.

It is a further object of the invention to provide an improved method for tuning a network.

It is a further object of the invention to provide an improved method for estimating the current performance of a network and its future performance under changed conditions ("what-if" scenarios).

SUMMARY OF THE INVENTION

In accordance with the invention, a system and method is provided for evaluating a communications network. A plurality of network evaluation signals, or probative test packets, are selectively sent and received through the network. Responsive to these evaluation signals, selective network evaluation parameters are determined and stored. Queuing theory analysis, responsive to these parameters, is determines the response time and throughput characteristics, including streaming capacity, utilization and performance, of the network.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
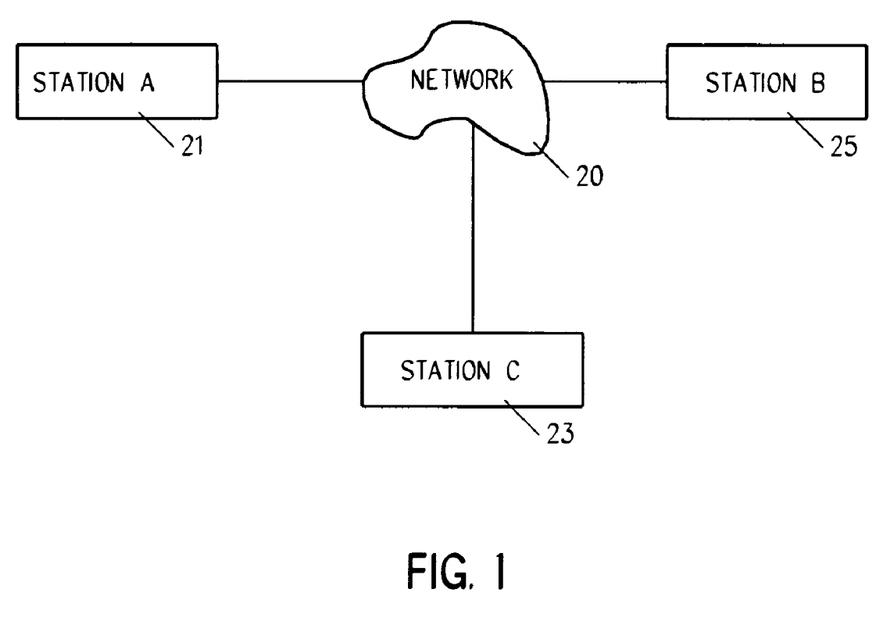
FIG. 1 illustrates a networked system in accordance with the preferred embodiment of the system of invention.

Referring to FIG. 1, a communications network cloud 20 is depicted with a client station 21, a server station 25 (or they can be peer stations) and a network management station 23 connected to the cloud at its boundary. The program code embodying a preferred embodiment of the invention can reside in any one or in any combination in each of the three stations 21–25. As used herein, a networked system refers to a network 20, intelligent end stations 21, 25, and the network 20 together with its intelligent end stations 21, 25 considered as a unitary whole.

Figure 2:
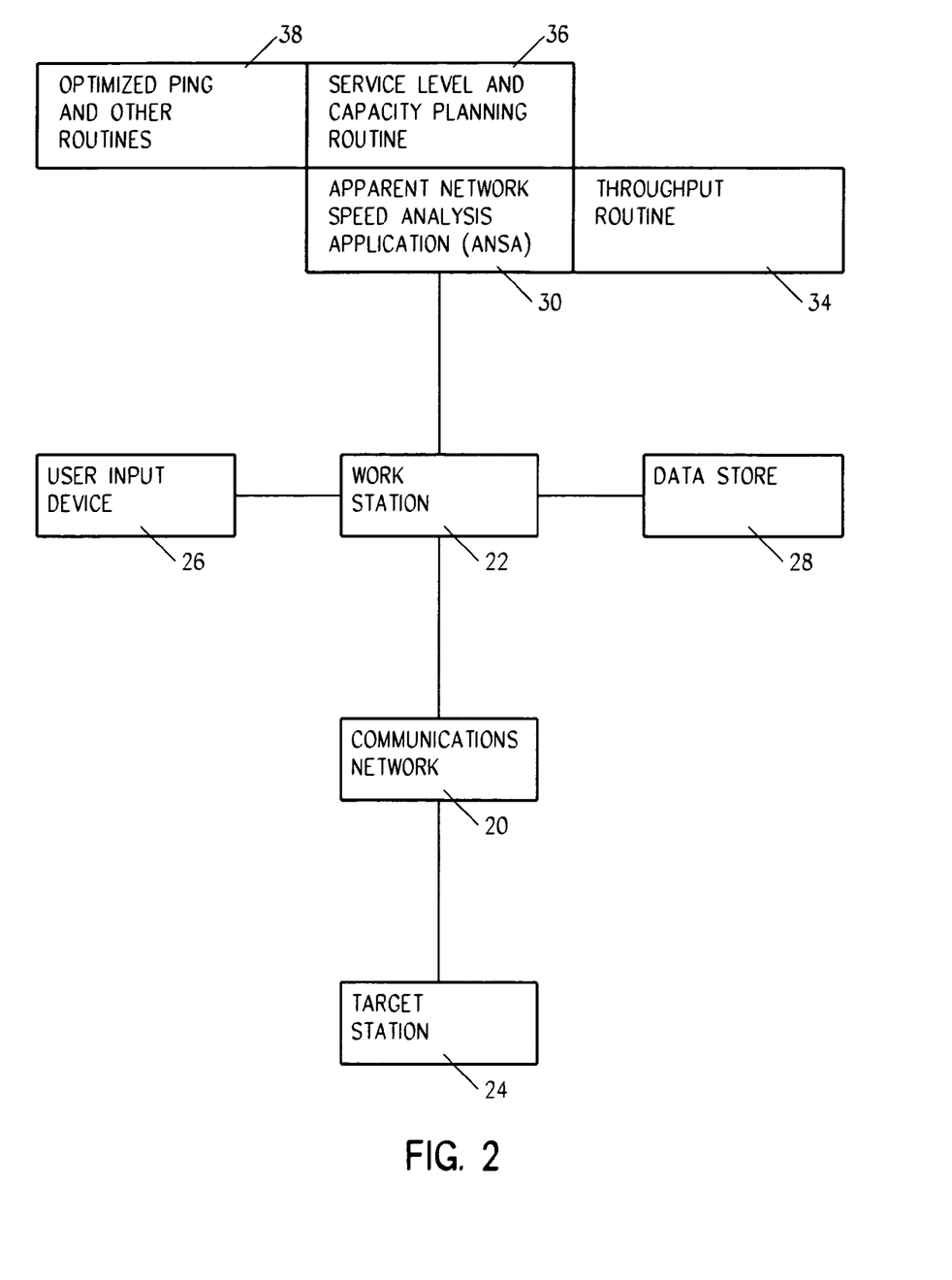
FIG. 2 illustrates a communications network and network evaluation system in accordance with a preferred embodiment of the system of the invention.

Referring to FIG. 2, in accordance with the preferred embodiment of the invention, apparent network speed analysis (ANSA) application 30 executes on workstation 22 to measure, monitor, estimate, capacity plan, and tune communications network 20 with respect to target station 24. A user input device 26 and data store 28 are provided at work station 22, and ANSA 30 includes a throughput routine 34, a service level and capacity planning routine 36, and optimized ping and other routines 38.

Throughput analysis routine 34 provides for defining, calculating, and using the following network concepts: Hop Count Factor, Duplex Factor, Throughput Factor, and Multi-Server Factor. Routine 34 relates to the receiving station, which as shown here may also be the sending station. As will be more fully described hereafter, in an exemplary embodiment, routines 38 first determine the MTU size of the network between send station 22 and target station 24, and then sends bursts of that packet size to target station 24. Target station 24 may echo or not. If it echos, throughput routine 34 would typically be provided at work station 22. However, routine 34 may also be provided at some station other than the station originating the packet bursts. If target station 24 does not echo, then it must time stamp the bursts and either do a throughput routine itself or provide them to some other station to perform the throughput analysis.

Routine 34 analyzes the time stamps to determine throughput speed of the network, which the line speed, which is the inverse of slope of line (e,i) (FIG. 5) and calculated as the total bits in a burst packet divided by the time from receipt of the first bit to the last bit. Routine 34 also includes a throughput utilization routine, deriving the throughput utilization as (1−(current available speed/maximum throughput speed).

Service level and capacity planning routine 36, responsive to the skilled use of routines 32 and 34, provides comprehensive "what-if" network planning facilities; calculation of the increase (or change) in network traffic before network response time service level is compromised; calculation of the additional file load capacity of the network, which is the additional file load before response time is compromised (for both prioritized and non-prioritized network cases); and determination of tuning recommendations for recommended window size for file transfer to fill remaining capacity (both respective and irrespective of maintaining response time service level, and for both prioritized and non-prioritized cases). In addition, routine 36 performs comprehensive what if end processor planning for the end systems with respect to processor-bound, I/O-bound, and general transactions.

Optimized ping and other methodologies routines 38 provides for optimized pinging, and extensions for ping, transaction, file echoing, bursts, multi streaming, and unidirectional transmission and recording.

Figure 3:
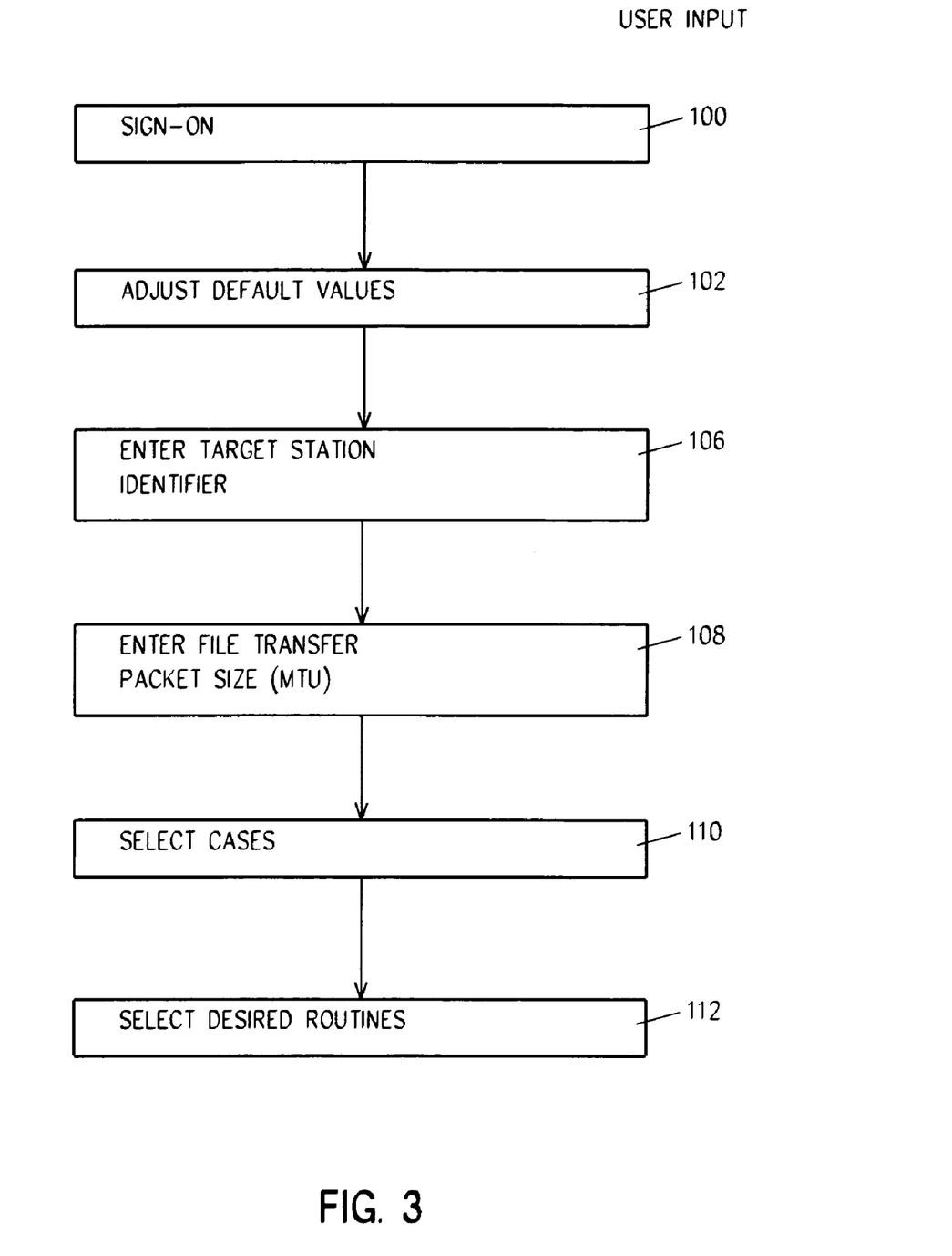
FIG. 3 illustrates a representative logic flow for user input.

Referring to FIG. 3, a flow chart is depicted in which program code or microprocessor-based microcode in a management function on a user, server, peer, management, or other device 21, 23, or 25 attaches to the network 20 and performs a sequence consisting of probative testing and analytical steps from which the capacity and utilization of the entire end-to-end system and its component end processor and network parts are stored, displayed, and retrieved thereby reflecting the past and present condition of the networked system. Furthermore, with user input of proposed changed conditions, the future capacity, utilization, and performance of the networked system are calculated and reported or displayed.

Referring further to FIG. 3, in accordance with the preferred embodiment of the method of the invention, in step 100 the user signs on through input device 26 to the apparent network speed analysis application (ANSA) 30.

In step 102, the user adjusts default values, if desired. These default values include number of short or long pings and transactions, number of bytes per ping, and time between pings and transactions, as well as whether ANSA's network calculation is to be based upon a default value for average network message length, a user input value for average network message length, or a value that the system calculates.

In step 106, the user enters the IP address (or name) of the target station 24.

In step 108, the user enters the file transfer packet size (MTU).

In step 110, the user selects any or all of hop count, duplex, and streaming file transfer cases if throughput analysis is desired.

In step 112, the user selects a desired interactive (transaction response time-oriented) window recommendation routine and/or batch (file transfer) window estimation routine.

Figure 4:
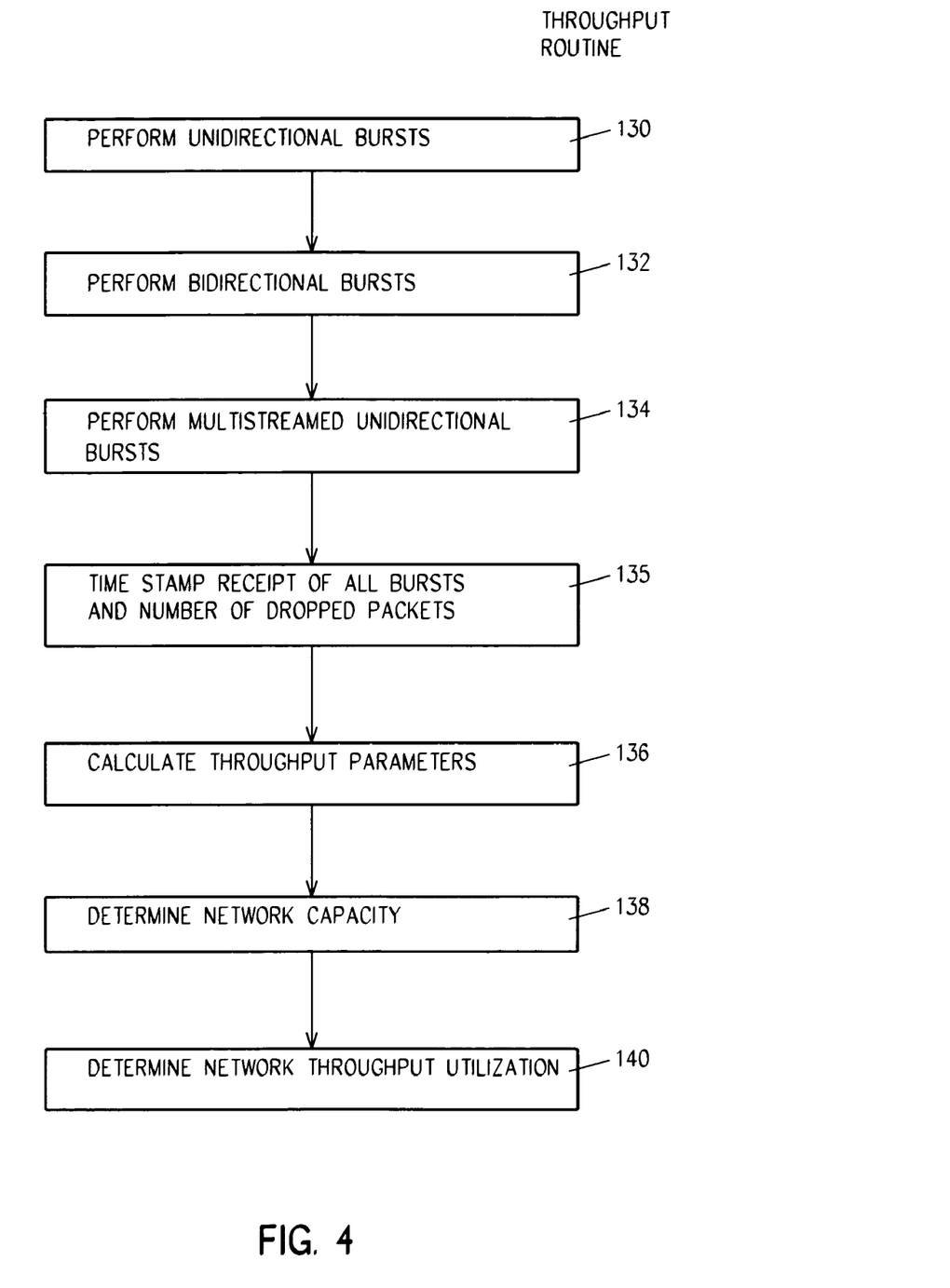
FIG. 4 illustrates the logic flow of the application and network throughput routine of the preferred embodiment of the invention.

Referring to FIG. 4, in accordance with a preferred embodiment of the invention, the apparent network speed analysis application (ANSA) 30 performs its throughput routine 34. Responsive to user selection of cases or functions in step 110, ANSA performs any or all of the functions in steps 132–140.

In step 132, ANSA 30 performs a unidirectional file transfer (FTP) or stream of unidirectional (non-echoed) bursts.

In step 134, ANSA 30 performs a bi-directional, concurrent file transfer or stream of echoed bursts.

In step 135, all received bursts are time stamped, and the number of dropped packets determined.

In step 136, throughput parameters, to be more thoroughly described hereafter, are calculated.

In step 138, ANSA 30 determines network throughput capacity by calculating such throughput parameters as hop count, duplex, and total throughput factors, as will be described more fully hereafter.

In step 140, network throughput utilization is calculated, as will be more thoroughly described hereafter.

Figure 5:
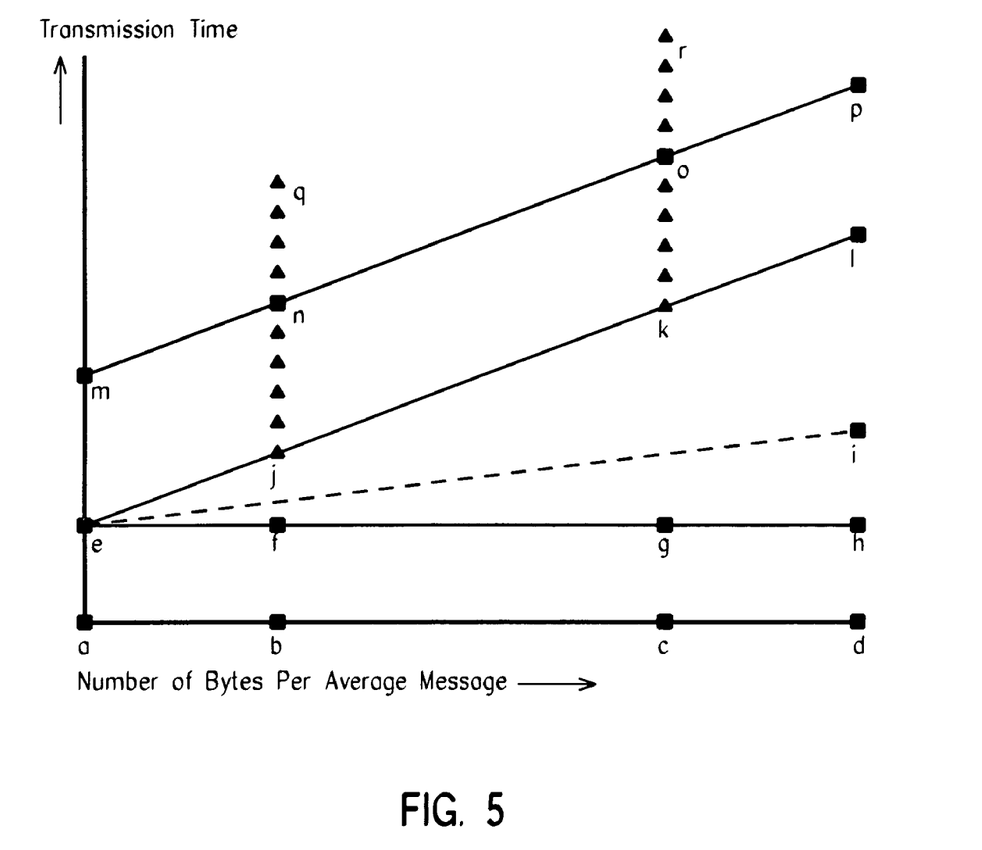
FIG. 5 geometrically illustrates ping and transaction results and bandwidth, utilization, and message size derivations in accordance with the preferred embodiment of the invention.

Referring to FIG. 5, a geometric chart illustrates various relationships pertinent to the present invention. The Y-axis represents transmission time across the network 20, so points a, e, and m are successively increasing times. The X-axis represents number of bytes per average network message, so points a, b, c, and d are successively increasing numbers of bytes representing the numbers of bytes of an average messages under varying conditions in the network.

a represents the origin point, which is zero bytes, zero time.

The data points (represented by triangles j through q, and k through r) represent the time it takes probative test sample packets to traverse the network. This could be a one way transmission or a two way (echo packet or ping) transmission.

b is the number of bytes in each of the j through q test samples.

c is the number of bytes in each of the samples k through r.

n represents the average transmission time for the set of samples j through q, with j representing the best transmission time (no queuing was experienced by this sample), and q represents the time it took for the worst surviving packet to be received.

o represents the average transmission time for the set of samples k through r, with k representing the best transmission time (no queuing was experienced by this sample), and r represents the time it took for the worst surviving packet to be received.

The average time spent waiting on queue in the network before receiving service is represented by segment (m, e). Line segments (e, l) and (m, p) are parallel, because (m, p) remains a constant distance of (m, e) from (e, l).

Chart time (e, a) represents the latency of the network. Certain delays in transmission and receipt across the network occur that are invariant and also independent of the length of the packet being transmitted. The sum total across the network of such delays is the network's latency. The physical length of the network is always a component of latency, for network length causes propagation delay which is identical for long and short frames. Device latency will be another component of latency if and only if the device through which packets are passing can handle longer and shorter frames in the same amount of time. Communication link serialization time is dependent on packet length and is, therefore, never a component of latency. And because latency here is construed to consist of the invariant delays inherent in the network, network queue delay is also never a component of latency.

The dashed line segment (e, i) represents the streaming speed of the network. As described in this patent application, this speed is calculated by transmitting a burst of (e.g., 10)

packets across the network, and calculating time from the receiver's receipt of the first to the last, and dividing the total number of bytes received by the time, and multiplying by 8 to get the bits per second throughput speed of the network.

Line segment (e, l) represents the discrete speed of the network (also called "datagram speed"). As first described in Klassen and Silverman, this is computed by considering the number of bytes per small packet b from number of bytes per large packet c and multiplying by 8 to get bits. Then the time for transmission and receipt of j is subtracted from the time for transmission and receipt of k to get time. Bits are divided by time to get bits per second discrete speed of the network.

Note, network discrete speed is less than network throughput speed in a multihop network, and equal in a single hop network. In this chart, speed is inversely proportional to line slope, so discrete speed will always have equal or greater slope than throughput speed.

The hop count value is derived by dividing the throughput speed by the discrete speed. This value is then multiplied by two if the throughput speed was calculated with echo packets and the network is full duplex. Geometrically, this calculation is represented in the chart by dividing the inverse of the slope of (e, i) by the inverse of the slope of (e, l) and multiplying the result by two.

The testing method for determining discrete line speed and discrete utilization involves transmission, receipt, and time stamping of test samples of (at least) two sizes. The geometric chart depicts samples of two sizes, namely smaller sample packets of b bytes length, and longer packets of c bytes length.

Line segment (f, j) represents the service time, Ts, for a packet of b bytes in this network. Line segment (j, n) represents the average time waiting for service, Tw, for a packet of b bytes in the network. Line segment (f, n) represents the service time plus the average time, known as total queue time or Tq, for a packet of b bytes in the network. Tq=Ts+Tw.

Similarly, line segment (g, k) represents the service time Ts for a packet of c bytes in this network. Line segment (k, o) represents the time waiting for service, Tw, for a packet of c bytes in the network. Line segment (g, o) represents Tq, the service time plus the average time waiting for service, for a packet of c bytes.

The total service time plus the average wait time for a packet is commonly called "total queue time," and is denoted as Tq. In the geometric chart, the Tq value is represented by the perpendicular raised from segment (e, h) to segment (m, p).

Network latency, segment (e, a), is determined from samples j through q and samples k through r as follows. Samples j and k determine the slope of segment (e, l), whose inverse represents the network's discrete speed. Segment (b, j) represents the total response time for transmission and receipt of a packet of b bytes that experiences no network queueing. Therefore (b bytes*8)/network discrete speed=Ts for b bytes, which is segment (f, j) on the chart. Subtracting Ts from total response time gives latency; that is, (b, j)–(f, j)=(b, f). In this example latency is calculated from discrete speed and short packet response time. Discrete speed and large packet response time could similarly be used to calculate latency, as also could be averaged large and small packet response time and size together with discrete speed.

Probative Packet Burst Transmissions

In accordance with the preferred embodiment of the invention, in order to establish network characteristics including the historical, current, and predicted future of states of a network for all types of network traffic, including interactive, browser, batch, and realtime traffic, probative transmissions, including echoed and non-echoed packets, of like and differing lengths, of like and differing network priority, individually and in bursts or streams, are sent and transit times measured, and queuing theory applied to the results. This involves transmission and receipt of bursts of probative packets suitable for determining the network's streaming speed (its maximum end to end speed for file and other batch transfers).

Burst Test Calculation of Streaming Speed

In accordance with the preferred embodiment of the invention, a method for calculating network streaming speed based upon bursting is provided. Because the method uses bursting, and not streaming, it is neither disruptive to other users of the network nor is it affected by other users of the network, including large networks and Internet connections.

Unlike other bursting methods, the method of the preferred embodiment of the invention does not yield inaccurate results as a result of failure to fill the network. This is because burst timing is performed only at the receiver, the node executing throughput routine 34. This means that the network will slow probative test frames down to the network's bottleneck speed, which is the rate at which they arrive at the receiver. As previously noted, in step 135, the receiver time stamps the receipt of the first through last frames of the burst, checks to make sure that frames arrived in sequence and without retransmission, and then in steps 136 calculates network speed by dividing the number of bits received in the burst by the total receipt time for the burst. If time stamping of receipt can only be done at the beginning of a frame or at the end of a frame, but not both, then in a burst of n frames, the measurements will actually cover n−1 frames, so the measure of bits divided by time will be for n−1 frames. In this manner, for a series of bursts, an accurate measure of best network streaming speed and average network streaming speed is derived. The best network streaming speed equals the actual clocking rate for the network from an end user application perspective, such as file transfer.

In accordance with this method, in order to use a burst test to determine the network's streaming speed, a plurality of packets is transmitted and the timestamping of their receipt by the receiver is used to calculate the network's current speed. The best observed speed for the plurality of samples is then taken to be the network's maximum speed. In a small network (such as a test laboratory), conditions may obtain such that traffic competing with the test bursts is not too great in volume, and that testing will stabilize quickly. By this it is meant that during testing it is possible to display the the best speed determined by testing, or for an expert system to keep track of the best speed yet determined by testing. Then subsequent test burst speeds can be observed and compared. The observer (or expert system) can then use various judgments to determine whether testing has stabilized. For example, if no new maximum has been observed after a certain period of time, and if several instances of current streaming speeds close to the maximum have been observed, then that is an indicator that testing has stabilized.

In a busy network, or across the internet, achieving testing stabilization may take more testing time than is desirable. This will depend on the traffic characteristics of the network, the number of actual hops in the network, and the number and size of of packets per burst test. (Note that in the preferred embodiment, a burst consists of ten packets, each packet being of identical size, namely the network's maximum MTU size which is the largest possible packet that can be sent without fragmentation occurring, meaning that this is the largest packet the network can transmit without the packet having to be divided into smaller packets and then reassembled at any point along the network path. It would be possible to transmit a different number of frames per burst, and these frames could be of like or different sizes, some or none of which could be the network's MTU size.) In order to minimize test time while achieving accurate results, the following method can be utilized.

In order to achieve accurate streaming speed calculation results with minimum testing, it is possible to create a "logical" best burst receipt constructed from all of the frames in all of the tests. This can be done in any of several ways. Without loss generality, the preferred embodiment in which there are ten uniform packets of maximum MTU length per burst is considered. The logical best burst is constructed by selecting the best receipt time for any packet number one. (Note that the set of bursts under consideration are only those for which all packets in the burst arrived at the receiver in proper sequence number order with no retransmissions.) Then from all the bursts, the best packets number one and two receipt time is selected, and so on up to packets one through ten. In this manner, a "logical burst", consisting of the best receipt times for i packets (where i=1, 2, . . . , 10) is constructed starting from a normalized receipt time of zero for the first bit received. The total arrival time of this logical best burst is calculated and the total number of bits in the burst divided by the receipt time for the burst. This results in an accurate value even in busy, multihop networks (including the internet) even in busy conditions.

An alternative method for calculating the network's streaming speed using the logical best burst is to compute the average packet receipt time (last bit receipt time minus first bit receipt time averaged for each packet in the logical best burst) and the average interpacket receipt time gap (the "spacing" that the network imposes upon packets across this connection between individual packets). The bits per packet divided by the addition of gap time and packet receipt time will also give the network's streaming speed.

Note also that an "average burst" can be constructed from the set of test bursts by the same technique as construction of the "best burst" by constructing a burst comprised of the averaged receipt times for all successful bursts (i.e., no dropped frames, no retransmissions, no out of sequence frames in the burst).

Using the exact same techniques and formulas, the network's average streaming speed can be computed, and then:

(1−(average streaming speed/streaming speed))*100= percent utilization.

Maximum Packet Size Testing

In the preferred embodiment, burst testing is preceded by network maximum packet size testing, a function of routines 38. Packets of successively larger size are sent with "do not fragment" turned on until a network message indicating fragmentation was necessary is received. Then successively smaller packets (or some other of many possible algorithms for selection of length of trial packets) are transmitted until no fragmentation is required and transmission is successful. Once the network's maximum packet size (MTU) is thus determined, bursts of packets of that size are used in steps 130–134 for determining network streaming speed. By this approach the number of interframe gaps and other such overheads are minimized, thus ensuring that the network streaming speed measures the maximum throughput the network and can provide for a perfectly tuned application using the maximum size packets which is accurate across all networks, including the Internet, and non disruptive.

Average Streaming Utilization

By measuring both best and average network speeds, where the average speed is the speed test traffic was able to achieve in competition with the average amount of user traffic, the method of the preferred embodiment of the invention provides for determining in steps 138 and 140 average streaming utilization of the network. The average streaming utilization percent is determined by taking the ratio of average burst rate to best burst rate and multiplying by 100.

In performing burst testing, a certain number of packets will be lost. This is normal in networks and occurs, for example, when some device in the network has full buffers when new frames arrive. In such cases, newly arriving frames are discarded until that device has had the chance to empty sufficient buffer space to accept new frames. Calculation of utilization therefore takes into account such occurrences of frame discards. In accordance with an embodiment of the present invention, frame discards are counted as instances of 100% utilization.

Instances of frame discards may be accounted for in the following manner. Each discarded frame is considered an instance of one hundred percent network utilization. The successful transmissions result in a measure of discrete utilization based on the observed ratio of average network delay to the standard deviation of average network delay. In order to account for dropped frames (which have "infinite delay," and therefore cannot be used in the calculation of the ratio), the dropped frames are accounted for not as instances of delays but as instances of 100 percent utilization that are averaged with the discrete utilization measure derived from successful transmissions.

For example, suppose a total of 100 sample frames are transmitted and that 5 sample frames are dropped. Suppose further that based upon the values of Tw and sigma Tw for the 95 successful transmissions, a network discrete utilization of 45% is determined. Since the 45% discrete utilization value does not take the discards into consideration, the 5 discards must also be considered. The following formula is used to derive the complete measure of discrete utilization (where all utilization measures are in decimal representation of percentage):

(percent successful transmissions*discrete utilization)+(percent drops*1.0)=complete measure of network utilization.

In the example, the calculation would be:

(0.95*0.45)+(0.05*1.0)=0.4215+0.05=0.4712= 47.12% complete discrete utilization.

Thus, this method for calculation of the value of the network's discrete utilization involves the measurement of the network's average delay waiting for service, measurement of the network's standard deviation of delay waiting for service, calculation of discrete utilization from the ratio of these observed values, and then refinement of that calculation by proportionate factoring in instances of dropped samples as cases of one hundred percent utilization to arrive at a final figure for percent of network discrete utilization.

Network Streaming Speed (the rate at which a network is capable of streaming a user's traffic, end to end, when otherwise vacant of traffic)

Formula:

network streaming speed=total bits in burst/total receipt time for burst

Average Network Streaming Speed (the speed at which the network is capable of streaming a user's traffic under current conditions, including the traffic of other users of the network.)

Formula:

average network streaming speed=total bits in burst/ average total receipt time for burst Network Streaming Utilization (the percent of the network currently in use that is not available to a user commencing use of an application that will stream traffic along the end to end network connection.)

Formula:

network streaming utilization=(network streaming speed/average network streaming speed)*100.

As noted above, this includes overhead incurred for retransmissions.

Network Discrete Utilization Including Dropped Sample Frames:

(percent successful transmissions*discrete utilization)+(percent drops*1.0)=network utilization including dropped frames.

As discussed above, in accordance with the preferred embodiment of the present invention, bursting, and not streaming, is used in steps 130–134 as the preferred method of determining the network's streaming speed. This is because streaming must be performed in an otherwise empty network in order to be accurate and in order not to interfere with others who are using the network for productive purposes.

Complex Burst Test Method

In accordance with an alternative embodiment of the present invention, the accuracy of the complex burst test method previously described is improved by ensuring that a sufficient number of short frames are transmitted in a burst so as to fill the network. Five things must be noted here.

First, since in the complex burst test method identical numbers of short and long frames are transmitted per test iteration, if the number of frames in the burst of shorter frames will fill the network, then so will the burst of longer frames.

Second, if this test is performed properly and completes properly, it will result in a measure of network speed slightly greater than the speed determined by the simple burst test. This is because the simple burst test measures the network at the application level, which means that factors that induce small amounts of network dead time, such as interframe gaps, come into play. In the complex burst test, the network's pure data rate is measured, absolutely exclusive of any dead time. This means that the complex burst test measures the network's clocking rate, while the simple burst test measures the slightly lower rate of maximum possible application-level throughput. As such, the complex burst test is particularly well suited to measuring the clocking rate of the network from the telco (communications service provider) perspective, while the simple burst test is particularly well suited to measure the network's performance from a streaming user application perspective.

Third, in a long or fast network, the complex burst test may require a transmission of a large enough number of frames so as to be disruptive to user traffic.

Fourth, the window size, that is, the number of frames required to fill the network, is determined by using information gathered in other tests (specifically, from best and average round trip discrete time and from simple burst tests), so if the complex test is run after these two tests have completed, there is no problem in determining the window size required for a proper complex burst run.

Fifth, from a practical perspective, the complex burst test is probably best run in large networks, fast networks at times when the network is not busy. Also, the complex burst test is ideally run on isolated, test networks for the purpose of testing vendor equipment capacity, and on newly operational links to verify that they have actually supplied the bandwidth required.

Formulas

In accordance with a specific embodiment of the invention, the explicit formulas calculated by ANSA are set forth hereafter. By deriving apparent bandwidth (response time capacity), network streaming utilization, network discrete utilization, and the network message size, all of queuing theory is now available for analytic and predictive purposes and can be applied, as described in Klassen and Silverman.

Network Streaming Speed (the rate at which a network is capable of streaming a user's traffic, end to end, when otherwise vacant of traffic)

Formula:

network streaming speed=total bits in burst/total receipt time for burst

Notes:
(1) This formula is applied to the best sample burst experienced for which all frames in the burst successfully arrived in sequence and with no retransmissions.
(2) Total receipt time for burst=receipt time for last bit in burst−receipt time for first bit in burst.
(3) In the preferred embodiment, burst testing that determines the network's streaming speed is preceded by network maximum packet size testing. Once the network's maximum MTU (maximum packet size) is determined, bursts of packets of that size are used in testing to determine network's streaming speed. This ensures that the network streaming speed measures the maximum throughput the network can provide for a perfectly tuned application using the maximum size packets. By this method the number of interframe gaps and other such overheads are absolutely minimized.
(4) The network streaming speed is the true measure of the slowest hop in the actual network.

Average Network Streaming Speed (the speed at which the network is capable of streaming a user's traffic under current conditions, including the traffic of other users of the network.)

Formula:

average network streaming speed=total bits in burst/ average total receipt time for burst Notes:
(1) In testing, a plurality of bursts of packets of a given size are transmitted. To calculate the network's average streaming speed, the average receipt time is calculated over the entire set of burst samples in the test, and this average time is what is used in the denominator of the formula.
(2) During the course of testing, packets will be lost and will require retransmission. These retransmissions will occur and will increase the total receipt time. Since the retransmissions are accounted for in the total receipt time, retransmissions are implicitly accounted for in the calculation of average network streaming speed.
(3) Below, this value is also referred to as "current network streaming speed".

Network Streaming Utilization (the percent of the network currently in use that is not available to a user commencing use of an application that will stream traffic along the end to end network connection.)

Formula:

network streaming utilization=(network streaming speed/average network streaming speed)*100.

As noted above, this includes overhead incurred for retransmissions.

Network Discrete Speed (this is the end to end rate at which datagram traffic will be carried across the network if the network is empty of other traffic and there is no retransmission required.)

Formula:

network discrete speed=(long packet bits−short packet bits)/(best long time−best short time)

Network Queue Wait Time, "Tw," as Derived from Testing (Tw is the actual average wait time experienced on queues before obtaining service between the ANSA test station and the target station)

Formula:

Tw=S (ping sample i time−best ping sample time) for all i/total number of ping samples.

That is, divide the sum of each ping sample minus the best sample by the total number of samples. This gives the average cross-network wait time for service.

Standard Deviation Network Queue Wait Time, σTw (the mean statistical variation of wait times on network queues prior to receiving service)

Formula:
The standard square of the square root of the differences between sample times, well known in statistical analysis.

Notes
(1) Standard statistical analysis is applied to ANSA probative test sample packets to determine the standard deviation and average wait times for service. Subtraction of the time of best transmission from all worse sample transmission times is used to derive queue wait time values. This works because the packet samples in a single set of transmissions are of equal length. This means that subtraction of best round trip or one way time from any other round trip or one way time eliminates device latency time, propagation delay time, and service time, which are equal for all samples. The subtraction therefore identifies all and only the time spent waiting for service, and thus Tw and σTw are derived from test packet samples by use of the formulas above.
(2) The formulas above for deriving values for Tw and σTw are applied to ANSA test packets. As such, they represent empirical measures of the actual current state of the network. The formulas and ratios described below provide a queuing theory-based analytic means for using these empirical measurements as a basis for determining the utilization and message size characteristics of the network.

Network Queue Wait Time, "Tw," from a Queueing Theory Perspective (the queueing theory formula for Tw):

Formula:

$Tw=pTs/(1-p)$ where Ts is the service time for an average network packet and p is the network's utilization.

Standard Deviation Network Queue Wait Time, σTw, from a Queueing Theory Perspective (the queueing theory formula for σTw ):

Formula:

$\sigma Tw=[\ddot{O}(p*(2-p))]*(Ts/(1-p))$

In accordance with this embodiment of the invention, this formula is used in derivation of the value of a network's discrete utilization value. The specific formulas in which it is used are shown in the copending application, Ser. No. 09/76,179 entitled "SYSTEM AND METHOD FOR DETERMINING NETWORK DISCRETE UTILIZATION". The importance of this queuing theory formula is that it relates the empirically derived value for σTw to utilization and service time values and, therefore, provides a necessary link between ANSAT testing methods and the derivation of discrete utilization and average network message length.

Advantages over the Prior Art

It is an advantage of the invention that there is provided an improved system and method for network measurement and planning.

It is an advantage of the invention that there is provided an improved method for calculating the streaming speed of a network.

It is an advantage of the invention that there is provided an improved method for determining end to end network streaming utilization.

It is an advantage of the invention that there is provided an improved method for tuning a network.

It is an advantage of the invention that there is provided an improved method for estimating the current performance of a network and its future performance under changed conditions ("what-if" scenarios).

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a solid or fluid transmission medium, magnetic or optical wire, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390, AS/400, PC or the like and pursuant to one or more, or a part of one or more, program elements, modules or objects generated from any programming language, such as C++, Java, Pl/1, or the like. And still further, each said step, or a file or object or the like implementing each said step, may be executed by special purpose hardware or a circuit module designed for that purpose.

Accordingly, the scope of protection of this invention is limited only by the following claims and their equivalents.

We claim:

1. Method for evaluating a network, comprising:
   executing a plurality of burst tests to determine a network's current streaming speed, wherein each said burst test includes
      transmitting a burst including a plurality of packets over said network to a receiver;
      determining a time of receipt by said receiver of each said packet in said burst;
      determining a total receipt time by said receiver of all packets in said burst; and
      discarding any burst in which all packets in said burst have not been received back and are not in the order said packets were transmitted;
   calculating an average receipt time of all bursts not discarded; and
   responsive to said average receipt time calculating a current speed of said network.

2. The method of claim 1, further comprising:
   evaluating a maximum speed of said network as a function of a best observed time of receipt for said bursts not discarded.

3. The method of claim 2, further comprising a step of:
   responsive to detecting several instances of said time of receipt representing current speeds close to said maximum speed, determining that testing has stabilized.

4. The method of claim 2, further comprising a step of:
   calculating an average streaming utilization percent by taking a ratio of the current speed of said network to the streaming speed of said network.

5. The method of claim 4, further comprising a step of:
   adjusting average streaming utilization for occurrences of burst frame discards.

6. The method of claim 1, further comprising:
   constructing a logical best burst from packets in said bursts not discarded; and
   evaluating streaming speed of said network as a function of a total number of bits in said logical best burst and total receipt time of said logical best burst.

7. The method of claim 6, each said burst including at least i packets, and said constructing comprising:
   selecting a best time of receipt of each nth (n=1,2 . . . i) packet of said bursts not discarded; and
   constructing as said logical best burst a burst comprising i packets of packets n=1,2 . . . i selected as having best times of receipt.

8. The method of claim 1, said transmitting step including a transmission of complex bursts in which short and long frames are transmitted per test iteration.

9. The method of claim 8, further comprising a step of determining the streaming speed of said network by dividing a difference in size of said short frames and said long frames by a difference in transmission time between short frames and long frames.

10. Method for establishing network characteristics including an historical, current, and predicted future of states of a network for all types of network traffic, including interactive, browser, batch, and realtime traffic, comprising the steps of:
    transmitting probative packets into said network, said packets including echoed and non-echoed packets, of like and differing lengths, of like and differing network priority, individually and in bursts;
    discarding any burst in which all packets in said burst have not been received back and discarding any burst in which any packets are received out of the order in which they were transmitted;
    measuring transit times of said probative packets;
    calculating an average receipt time of all bursts not discarded;
    responsive to said average receipt time calculating a current speed of said network; and
    responsive to said transit times and said current speed, determining capacity and utilization of said network and of a component end processor and network parts for deriving a streaming speed of said network.

11. System for evaluating the characteristics of a network, comprising:
    a send node for communicating probative packets into said network, said packets including burst packets;
    a receive node for determining that frames of said packets are received in sequence and without retransmission, and an elapsed time between first through last frames of said packets;
    a speed analysis application node responsive to said elapsed time and a size of said packets for calculating network speed.

12. A program storage device readable by a machine, tangibly embodying a program of instructions executable by a machine to perform method steps for evaluating characteristics of a network, said method steps comprising:
    communicating probative packets into said network, said packets including burst packets;
    determining at a receiver of said packets that frames of said packets are received in sequence and without retransmission, and an elapsed time between first through last frames of said packets;
    responsive to said elapsed time and a size of said packets calculating network speed.

13. An article of manufacture comprising:
    a computer useable medium having computer readable program code means embodied therein for evaluating a network, the computer readable program means in said article of manufacture comprising:
       computer readable program code means for causing a computer to effect executing a burst test to determine a network's streaming speed, wherein each said burst test includes
          transmitting a plurality of packets over said network to a receiver;
          discarding any burst in which all packets in said burst have not been received back and discarding any burst in which any packets are received out of the order in which they were transmitted; and determining a time of receipt of each said packets by said receiver;

calculating an average receipt time of all bursts not discarded;

computer readable program code means for causing a computer to effect responsive to said average receipt time, calculating capacity and utilization of said network and of a component end processor and network parts for deriving a current speed of said network.

14. A program storage device readable by a machine, tangibly embodying a program of instructions executable by a machine for evaluating characteristics of a network, said instructions comprising:

transmitting probative packets into a network, said packets including echoed and non-echoed packets, of like and differing lengths, of like and differing network priority, individually and in bursts;

discarding any burst in which all packets in said burst have not been received back and discarding any burst in which any packets are received out of the order in which they were transmitted;

measuring the transit times of said probative packets;

calculating an average receipt time of all bursts not discarded;

responsive to said average receipt time calculating a current speed of said network; and responsive to said transit times and said current speed, determining capacity and utilization of said network and of a component end processor and network parts for deriving a streaming speed of said network.

15. A program storage device readable by a machine, tangibly embodying a program of instructions executable by a machine to perform operations for evaluating characteristics of a network, said operations comprising:

executing a plurality of burst tests to determine a network's current speed, wherein each said burst test includes transmitting a burst including a plurality of packets over said network to a receiver;

determining a time of receipt by said receiver of each said packet in said burst;

determining a total receipt time by said receiver of all packets in said burst; and discarding any burst in which all packets in said burst have not been received back and are not in the order said packets were transmitted;

calculating an average receipt time of all bursts not discarded; and responsive to said average receipt time calculating a current speed of said network.

16. The program storage device of claim 15, said operations further comprising:

evaluating a maximum speed of said network as a function of a best observed time of receipt for said bursts not discarded.

17. The program storage device of claim 16, said operations further comprising:

responsive to detecting several instances of said time of receipt representing current speeds close to said maximum speed, determining that testing has stabilized.

18. The program storage device of claim 15, said operations further comprising:

constructing a logical best burst from packets in said bursts not discarded; and evaluating streaming speed of said network as a function of a total number of bits in said logical best burst and total receipt time of said logical best burst.

19. The program storage device of claim 18, each said burst including at least i packets, and said operations further comprising:

selecting a best time of receipt of each nth (n=1,2 . . . i} packet of said bursts not discarded; and constructing as said logical best burst a burst comprising i packets of packets n=1,2 . . . i selected as having best times of receipt.

20. The program storage device of claim 15, said operations further comprising:

calculating an average streaming utilization percent by taking a ratio of network streaming speed to average network streaming speed.

21. The program storage device of claim 20, said operations further comprising:

adjusting average streaming utilization for occurrences of burst frame discards.

22. The program storage device of claim 15, said transmitting operation including a transmission of complex bursts in which short and long frames are transmitted per test iteration.

23. The program storage device of claim 22, said operations further comprising:

determining streaming speed of said network by dividing a difference in size of said short frames and said long frames by a difference in transmission time between short frames and long frames.

24. Method for evaluating a network, comprising:

executing a a plurality of burst tests to determine a network's current speed, wherein each said burst test includes transmitting a burst including a plurality of packets over said network to a receiver;

determining a time of receipt by said receiver of each said packet in said burst;

determining a total receipt time by said receiver of all packets in said burst; and discarding any burst in which all packets in said burst have not been received back and discarding any burst in which all packets are not in the order said packets were transmitted;

calculating an average receipt time of all bursts not discarded;

responsive to said average receipt time calculating a current speed of said network;

evaluating a maximum speed of said network as a function of a best observed time of receipt for said bursts not discarded; and responsive to detecting several instances of said time of receipt representing current speeds close to said maximum speed, determining that testing has stabilized.

* * * * *